United States Patent [19]

Corpart et al.

[11] Patent Number: 5,798,415
[45] Date of Patent: Aug. 25, 1998

[54] CATIONIC FLUORO COPOLYMERS FOR THE OLEOPHOBIC AND HYDROPHOBIC TREATMENT OF BUILDING MATERIALS

[75] Inventors: Jean-Marc Corpart, Sannois; Marie-Jose Lina; Christian Bonardi, both of Lyons; Andre Dessaint, Clermont, all of France

[73] Assignee: Elf Atochem S.A., France

[21] Appl. No.: 565,615

[22] Filed: Nov. 29, 1995

[30] Foreign Application Priority Data

Nov. 29, 1994 [FR] France ................... 94 14281

[51] Int. Cl.⁶ .................................................. C08F 8/00
[52] U.S. Cl. ..................... 525/129; 525/166; 525/168; 525/175
[58] Field of Search ....................... 525/123, 125, 525/129, 166, 168, 175; 524/589; 528/48, 52, 401; 427/407.1, 412.4; 418/421, 422, 423.1, 424.2

[56] References Cited

U.S. PATENT DOCUMENTS 4,127,711  11/1978  Lore et al. .

5,247,008  9/1993  Michels et al. .

FOREIGN PATENT DOCUMENTS

| 0 542 598 A1 | 5/1993 | European Pat. Off. . |
| 0 552 630 A1 | 7/1993 | European Pat. Off. . |
| 06240238 | 8/1994 | Japan . |
| 6-240238 | 8/1994 | Japan ........................... 3/18 |

OTHER PUBLICATIONS

French Search Report (Sep. 1995).

*Primary Examiner*—Duc Truong
*Attorney, Agent, or Firm*—Bell, Boyd & Lloyd

[57] ABSTRACT

The invention relates to fluoro copolymers containing hydroxyl groups and amino groups in salified or quaternized form.

With such a copolymer and a polyisocyanate, an aqueous composition which is useful for the oleophobic and hydrophobic treatment of building materials may be prepared.

6 Claims, No Drawings

CATIONIC FLUORO COPOLYMERS FOR THE OLEOPHOBIC AND HYDROPHOBIC TREATMENT OF BUILDING MATERIALS

FIELD OF THE INVENTION

The present invention relates to the oleophobic and hydrophobic treatment of building materials, such as bricks, tiles, natural or reconstituted stone, ceramics, plasters, concretes, cements, mortars, wood, glass, metals and plastics, and relates more particularly to the anti-soiling and anti-graffiti treatment of the said materials.

BACKGROUND OF THE INVENTION

Products or compositions which allow either of these properties to be obtained in building materials are already known. There may firstly be mentioned silicones (patents FR 2,469,437 and 2,474,518) which effectively impart a hydrophobic nature, but which are not oil-repellent.

Processes are also known (patent FR 2,313,987) which consist in applying, separately or as a mixture, a water-soluble polymer compound derived from unsaturated carboxylic acid and a solution of an organosilicon compound. However, these compounds are not easy to use and the oil-repellent and water-repellent properties only appear after a long period of drying at room temperature or after a heated drying.

The use of hydroxylated copolymers of the acrylic-siloxane type, alone or crosslinked with other resins, has also been proposed. However, these water-resistant products offer no resistance to oils.

The use of aluminium polyoxostearate, polyvinyl alcohol (patent FR 2,607,821), acrylic polymers (patent U.S. Pat. Nos. 4,353,745 and 4,241,141), waxes of plant or mineral origin (patents WO 80/01072 and FR 2,445,361), polysaccharide (patent WO 88/10156) and isocyanate prepolymers (patents U.S. Pat. No. 4,716,056, EP 340,237 and EP 404,895) has also been proposed. However, these products do not have any oil-repellent property.

In order for the treatment to be of lasting effectiveness, the coatings used are usually crosslinked. This crosslinking takes place in situ, on the substrate to be treated, and makes use of chemical groups capable of reacting at room temperature and without thermal activation, only catalysts being tolerated. In this perspective, the reaction of isocyanate units with hydroxyl groups (patents U.S. Pat. No. 4,716,056, EP 340,237, BE 901,692, GB 2,187,196 and EP 404,895) or with moisture present on the support (patent GB 2,187,196) is often exploited. Generally, the coating decomposes into two layers which are successively applied to the substrate: the first layer contains, for example, the hydroxyl groups and the second consists of urethane prepolymers containing free isocyanate units. The treatment may also be effected as one layer by mixing, prior to application, the compound containing the —OH groups and the prepolymer containing isocyanate units; however, in this case, the shelf life of the mixture in a container is short. Moreover, the reactivity of the isocyanates makes it necessary to dissolve the compounds in organic solvents containing no —OH groups (ketones, esters, white spirit, etc.). Coatings of this type generally have no oil-repellent property.

In order to impart to the building materials water-repellent, oil-repellent, anti-graffiti and non-stick properties which are stable with respect to ageing and inclement weather, it has been proposed in patent FR 2,540,131 to use a composition comprising, by weight:

from 0.1 to 25% of a fluoro copolymer containing OH groups, from 2 to 25% of an aliphatic or aromatic polyisocyanate or isocyanate prepolymer, from 0.1 to 10% of a catalyst, and one or more organic solvents for dilution in order to complete to 100%.

This composition effectively imparts oil-repellent and water-repellent properties to the materials treated. However, it still requires the use of a dilution operation in a solvent medium.

DESCRIPTION OF THE INVENTION

It has now been found that this problem may be solved using fluoro copolymers containing not only OH groups but also amino groups in salified or quaternized form. With these novel cationic fluoro copolymers, aqueous compositions may be prepared which, when applied to stone, concrete and more generally to any building material, do not change the surface appearance of the materials and impart thereto, after a very brief period of drying, combined water-repellent, oil-repellent and anti-graffiti properties which are stable with respect to ageing and inclement weather.

The first subject of the present invention is thus fluoro copolymers in salified or quaternized form, characterized in that they are made up of (% by weight):

(a) 50 to 92%, preferably 70 to 90%, of one or more polyfluoro monomers of general formula:

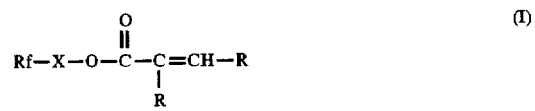

in which Rf represents a perfluoroalkyl radical with a straight or branched chain containing 2 to 20 carbon atoms, preferably 4 to 16 carbon atoms, X represents a divalent grouping linked to O by a carbon atom and possibly containing one or more oxygen, sulphur and/or nitrogen atoms, one of the symbols R represents a hydrogen atom and the other represents a hydrogen atom or an alkyl radical containing 1 to 4 carbon atoms;

(b) 1 to 25%, preferably 2 to 18%, of one or more monomers of general formula:

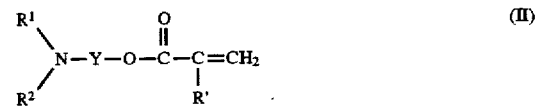

in which Y represents a linear or branched alkylene radical containing 1 to 4 carbon atoms, R' represents a hydrogen atom or an alkyl radical containing 1 to 4 carbon atoms, $R^1$ and $R^2$, which may be identical or different, each represent a hydrogen atom, a linear or branched alkyl radical containing 1 to 18 carbon atoms or a hydroxyethyl or benzyl radical, or $R^1$ and $R^2$, together with the nitrogen atom to which they are attached, form a morpholino, piperidino or pyrrolidinyl radical;

(c) 1 to 25%, preferably 2 to 15%, of one or more monomers of general formula:

in which R" represents a hydrogen atom or an alkyl radical containing 1 to 4 carbon atoms and Z represents an alkylene radical containing 2 to 4 carbon atoms; and (d) 0 to 30%, preferably 0 to 8%, of one or more of any monomers other than the monomers of formulae I, II and III.

The fluoro monomers of formula (I) may be prepared according to known processes, for example by esterification of the corresponding polyfluoro alcohols of formula:

$$Rf—X—OH \quad (IV)$$

using an alkenecarboxylic acid of formula:

$$HO-\underset{\underset{O}{\|}}{C}-\underset{R}{C}=CH-R \quad (V)$$

such as, for example, acrylic acid, methacrylic acid or crotonic acid, in the presence of a catalyst such as sulphuric acid or p-toluenesulphonic acid. Instead of the acids of formula (V), the esters, anhydrides or halides thereof may also be used. Examples of polyfluoro alcohols of formula (IV) which may more particularly be mentioned are those of formulae (IV-1) to (IV-10) below:

$$R_f—(CH_2)_p—SO_2N—(CH_2)_q—OH \quad (IV\text{-}1)$$
$$\phantom{R_f—(CH_2)_p—SO_2N—(CH_2)_q—}|$$
$$\phantom{R_f—(CH_2)_p—SO_2N—(CH_2)_q—}R$$

$$R_f—SO_2N—(CH_2)_q—OH \quad (IV\text{-}2)$$
$$\phantom{R_f—SO_2}|$$
$$\phantom{R_f—SO_2}R$$

$$R_f—(CH_2)_p—OH \quad (IV\text{-}3)$$

$$R_f—(CH_2)_p—O—(CH_2)_q—OH \quad (IV\text{-}4)$$

$$R_f—(CH_2)_p—S—(CH_2)_q—OH \quad (IV\text{-}5)$$

$$R_f—(CH_2)_p—(OCH_2CH_2)_q—OH \quad (IV\text{-}6)$$

$$R_f—(CH_2)_p—SO_2—(CH_2)_q—OH \quad (IV\text{-}7)$$

$$R_f—\underset{\underset{O}{\|}}{C}—\underset{R}{N}—(CH_2)_p—OH \quad (IV\text{-}8)$$

$$R_f—\underset{\underset{O}{\|}}{C}—O—(CH_2)_p—OH \quad (IV\text{-}9)$$

$$R_f—CH=CH—(CH_2)_p—OH \quad (IV\text{-}10)$$

in which $R_f$ and R have the same meanings as above, the symbols p and q, which may be identical or different, each represent an integer ranging from 1 to 20 and, preferably, equal to 2 or 4.

For economic and practical reasons, it is particularly advantageous to use a mixture of compounds having different radicals $R_f$.

Examples of monomers of formula (II) which may more particularly be mentioned are the acrylates and methacrylates of the following amino alcohols: 2-dimethylaminoethanol, 2-diethylaminoethanol, 2-dipropylaminoethanol, 2-diisobutylaminoethanol, 2-N-tert-butylaminoethanol, 2-(N-tert-butyl-N-methylamino) ethanol, 2-morpholinoethanol, 2-(N-methyl-N-dodecylamino)ethanol, 2-(N-ethyl-N-octadecylamino) ethanol, 2-[N-ethyl-N-(2-ethylhexyl)amino]ethanol, 2-piperidinoethanol, 2-(1-pyrrolidinyl)ethanol, 3-diethylamino-1-propanol, 2-diethylamino-1-propanol, 1-dimethylamino-2-propanol, 4-diethylamino-1-butanol, 4-diisobutylamino-1-butanol, 1-dimethylamino-2-butanol, 4-diethylamino-2-butanol. These esters may be prepared, for example, according to the method described in U.S. Pat. No. 2,138,763. The preferred monomer of formula (II) is dimethylaminoethyl methacrylate or N-tert-butylaminoethyl methacrylate.

Examples of monomers of formula (III) which may more particularly be mentioned are the acrylates and methacrylates of alkylene glycols such as ethylene glycol and propylene glycol. The preferred monomer of formula (III) is 2-hydroxyethyl methacrylate.

As examples of comonomers (d) which may be used within the context of the present invention, there may be mentioned:

lower olefinic hydrocarbons, which may or may not contain halogen, such as ethylene, propylene, isobutene, 3-chloro-1-isobutene, butadiene, isoprene, chloro- and dichlorobutadienes, fluoro- and difluorobutadienes, 2,5-dimethyl-1,5-hexadiene and diisobutylene;

vinyl, allyl or vinylidene halides such as vinyl or vinylidene chloride, vinyl or vinylidene fluoride, allyl bromide and methallyl chloride;

styrene and derivatives thereof, such as vinyltoluene, α-methylstyrene, α-cyanomethylstyrene, divinylbenzene and N-vinylcarbazole;

alkyl vinyl ketones such as methyl vinyl ketone;

unsaturated acids, such as acrylic acid, methacrylic acid, α-chloroacrylic acid, crotonic acid, maleic acid, fumaric acid, itaconic acid, citraconic acid and senecioic acid, the anhydrides thereof and the esters thereof such as the allyl, methyl, butyl, isobutyl, hexyl, heptyl, 2-ethylhexyl, cyclohexyl, lauryl, stearyl or cellosolve acrylates and methacrylates, dimethyl maleate, ethyl crotonate, methyl hydrogen maleate, butyl hydrogen itaconate, and the diacrylates and dimethacrylates of glycol or of polyalkylene glycol;

the unsaturated esters of formula:

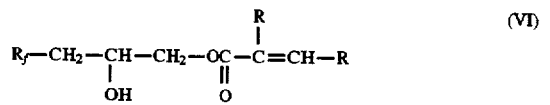

$$R_f—CH_2—CH—CH_2—O\underset{\underset{O}{\|}}{C}—\underset{R}{\overset{|}{C}}=CH—R \quad (VI)$$
$$\phantom{R_f—CH_2—}\underset{OH}{|}$$

obtained by condensation of a fluoro epoxide:

$$R_f—CH_2—CH—CH_2 \quad (VII)$$
$$\phantom{R_f—CH_2—}\underset{O}{\diagdown\diagup}$$

with a monocarboxylic alkenoic acid of formula (V);

the chlorides of formula:

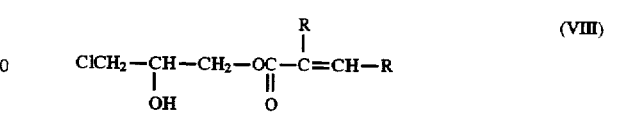

$$ClCH_2—CH—CH_2—O\underset{\underset{O}{\|}}{C}—\underset{R}{\overset{|}{C}}=CH—R \quad (VIII)$$
$$\phantom{ClCH_2—}\underset{OH}{|}$$

obtained by addition of epichlorohydrin to an acid of formula (V);

the ether acrylates and ether methacrylates of mono- and poly-ethylene glycols or -propylene glycols of formula:

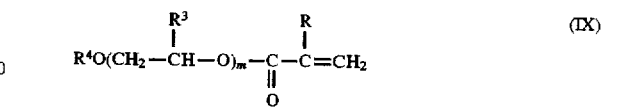

$$R^4O(CH_2—CH—O)_m—\underset{\underset{O}{\|}}{C}—\underset{R}{\overset{|}{C}}=CH_2 \quad (IX)$$
$$\phantom{R^4O(CH_2—}\underset{R^3}{|}$$

in which $R^3$ represents a hydrogen atom or a methyl radical, $R^4$ represents an alkyl radical and m is an integer between 1 and 50;

the acrylates and methacrylates of polyethylene glycol or of polypropylene glycol of formula:

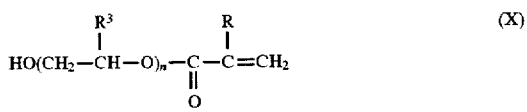

in which R and $R^3$ have the same meanings as above and n is an integer between 2 and 50;

acrylonitrile, methacrylonitrile, 2-chloroacrylonitrile, 2-cyanoethyl acrylate, methyleneglutaronitrile, vinylidene cyanide, alkyl cyanoacrylates such as isopropyl cyanoacrylate, trisacryloylhexahydro-s-triazine, vinyltrichlorosilane, vinyltrimethoxysilane, vinyltriethoxysilane;

allyl alcohol, allyl glycolate, isobutenediol, allyloxyethanol, o-allylphenol, divinylcarbinol, glyceryl allyl ether, acrylamide, methacrylamide, maleamide and maleimide, N-(cyanoethyl) acrylamide, N-isopropylacrylamide, diacetoneacrylamide, N-(hydroxymethyl)-acrylamide and -methacrylamide, N-(alkoxymethyl)-acrylamides and -methacrylamides, glyoxalbisacrylamide, sodium acrylate or methacrylate, 2-sulphoethyl acrylate, vinylsulphonic acid and styrene-p-sulphonic acid and the alkali metal salts thereof, 3-aminocrotonitrile, monoallylamine, vinylpyridines, glycidyl acrylate or methacrylate, allyl glycidyl ether, acrolein;

allyl esters such as allyl acetate and allyl heptanoate;

vinyl esters such as vinyl acetate, vinyl propionate, vinyl esters of acids known on the market under the name "Versatic acids", vinyl isobutyrate, vinyl senecioate, vinyl isodecanoate, vinyl stearate; and alkyl vinyl ethers, which may or may not contain halogen, such as cetyl vinyl ether, dodecyl vinyl ether, isobutyl vinyl ether, ethyl vinyl ether and 2-chloroethyl vinyl ether.

The cationic fluoro copolymers according to the invention are prepared by copolymerization of the monomers in solution in an organic solvent or in a mixture of organic solvents such as acetone, tetrahydrofuran, dioxane, dimethylformamide, N-methyl-2-pyrrolidone, dimethyl sulphoxide, ethyl acetate, isopropyl acetate, butyl acetate, methyl ethyl ketone, methyl isobutyl ketone, ethanol and isopropanol. As polymerization solvent, it is preferred to use N-methyl-2-pyrrolidone (NMP), acetone or an NMP/acetone binary mixture. The total concentration of monomers may range from 5 to 60% by weight.

The polymerization is carried out in the presence of initiator(s) which is (are) used to a proportion of 0.1 to 1.5% relative to the total weight of monomers employed. Initiators which may be used are peroxides such as, for example, benzoyl peroxide, lauroyl peroxide, succinyl peroxide and tert-butyl perpivalate, or azo compounds such as 2,2'-azobisisobutyronitrile, 4,4'-azobis(4-cyanopentanoic acid) and azodicarbonamide. The process may also be performed in the presence of UV radiation and photo-initiators such as benzophenone, 2-methylanthraquinone or 2-chlorothioxanthone. The length of the polymer chains may, if so desired, be controlled using chain transfer agents such as alkyl mercaptans, carbon tetrachloride or triphenylmethane, which are used to a proportion of 0.05 to 1% relative to the total weight of monomers.

The reaction temperature may vary within a wide range, that is to say between room temperature and the boiling point of the reaction mixture. The process is preferably performed between 60° and 90° C.

The copolymer may be salified using strong or moderately strong inorganic or organic acids, that is to say acids whose dissociation constant or whose first dissociation constant is greater than $10^{-5}$. There may, for example, be mentioned hydrochloric acid, hydrobromic acid, sulphuric acid, nitric acid, phosphoric acid, acetic acid, formic acid, propionic acid or lactic acid. Acetic acid is preferably used.

Instead of converting the copolymer into a salt, it may be quaternized using a suitable quaternizing agent such as methyl iodide, ethyl iodide, dimethyl sulphate, diethyl sulphate, benzyl chloride, trimethyl phosphate or methyl p-toluenesulphonate.

The cationic fluoro copolymer solution obtained is diluted with water. The lighter synthesis solvent(s), especially the acetone, may optionally be removed by distillation under vacuum at a temperature between 40° and 90° C. This operation makes it possible to obtain an aqueous solution of the fluoro copolymer with a flash point above 100° C.; the aqueous solution remains stable after evaporation of the solvent. In the case of the use of a polymerization solvent containing a function liable to react with the isocyanate units, such as ethanol or isopropanol, distillation is necessary in order to avoid interfering reactions during use of the composition according to the invention. The weight-average molecular masses of the fluoro copolymers according to the invention are between 2000 and 50000 g/mol. These molecular masses may be determined by gel permeation. The copolymers according to the invention possess emulsifying properties, and a copolymer solution diluted to 10% by weight with water has a surface tension $\gamma_L$ of the order of 35 to 50 mN/m.

Another subject of the present invention is compositions comprising, by weight:

(A) from 0.1 to 25%, preferably from 1 to 10%, of at least one cationic fluoro copolymer as described above;

(B) from 0.1 to 25%, preferably from 0.1 to 10%, of at least one aliphatic, araliphatic or aromatic polyisocyanate;

(C) from 0 to 35%, preferably from 0 to 15%, of one or more water-miscible solvents; and (D) water for dilution in order to complete to 100%, the proportions of the components being chosen such that the NCO/OH molar ratio is at least equal to 1.2 and such that the content of non-volatile materials in these compositions does not exceed 50% and is preferably less than 20%.

The component (B) of the compositions according to the invention is a polyisocyanate containing 5 to 25% by weight of free NCO units, which may be placed in emulsion in water or in a solution of the fluoro copolymer (A) diluted with water.

The polyisocyanates of type (B) are described, for example, in patents EP 206,059, EP 554,747 and U.S. Pat. No. 4,663,337. They are prepared from linear aliphatic, cycloaliphatic, araliphatic and/or aromatic molecules containing NCO groups. The polyisocyanates of biuret, isocyanurate and uret-dione structure mainly based on hexamethylene diisocyanates are particularly recommended. There may be mentioned, by way of example, N,N',N"-tris(6-isocyanatohexyl)biuret and N,N',N"-tris(6-isocyanatohexyl) isocyanurate. In order to facilitate their dispersion in water, the polyisocyanates (B) are generally made hydrophilic by reacting some of the isocyanate groups with molecules containing a reactive group (alcohol for example) and a cationic hydrophilic group (for example a tertiary amine salified with an acid or quaternized), an anionic hydrophilic group (for example a carboxylic group salified with a base) or a nonionic hydrophilic group (for example ethylene oxide units containing from 5 to 100 units).

The polyisocyanates (B) may also be used in their hydrophobic form without modification intended to make them hydrophilic, since the emulsifying properties of the copolymers (A) enable them to be dispersed in water. In this case, the composition according to the invention is prepared by emulsifying the compound (B) in a solution of (A) diluted with water.

If the polyisocyanate (B) used is hydrophilic, the composition according to the invention may be prepared either by dispersing the compound (B) in water with stirring and then by adding the copolymer (A) in solution diluted with water, or by dispersing the polyisocyanate (B) directly in a dilute solution of (A).

The homogenization of the two components does not require the use of complicated technical means. However, for optimal homogenization, it is preferable to use at least a paddle stirrer mounted on a drill. Depending on the intensity of the stirring, the size of the particles in the dispersion is between 100 and 500 nm. On account of the surface properties of the compound (A), the molecules of the copolymer bind by adsorption to the droplets of polyisocyanate, in the same manner as molecules of emulsifying agent.

The free NCO groups of the polyisocyanate may react with the OH functions of the copolymer (A) and with water. These reactions may lead to a marked increase in the viscosity of the composition. The interval before use of the preparation is directly dependent on this viscosification.

Surprisingly, use of the system claimed containing a cationic copolymer (A) allows a long shelf life in a container, generally considerably longer than 24 hours.

The interval before use is thus considerably increased compared with anionic systems.

Since some of the NCO groups of the polyisocyanate (B) react with water, the process is generally performed with an excess of NCO groups relative to the alcohol functions borne by the copolymer (A). The NCO/OH ratio should be at least equal to 1.2 and is preferably at least equal to 1.5.

The compositions according to the invention may be applied in one or more layers according to techniques which are well known per se, for example by spraying, immersion or spreading with a brush or a roller, so as to deposit 80 to 800 g of composition according to the invention per m² of surface to be treated.

The coating obtained is conventionally dried at room temperature. It may also be dried at higher temperature, in an oven or a kiln.

After applying the reactive mixture to the substrate, the water and the solvents which form the dispersion medium evaporate and allow the droplets of polyisocyanate (B) to agglomerate and allow the simultaneous diffusion of the molecules of the fluoro copolymer (A) into the droplets.

The NCO and OH groups react: the film obtained with the composition claimed is crosslinked.

According to another mode of the present invention, it is also possible to carry out the application by first depositing a solution of the component (A) on the support to be treated, followed by an aqueous dispersion of the component (B), or vice versa.

As well as being suitable more particularly for the anti-soiling and anti-graffiti treatment of building materials, the cationic fluoro copolymers according to the invention may also be used, alone or in association with a polyisocyanate, for the oleophobic and hydrophobic treatment of other substrates such as paper, textiles, non-wovens, leather and moquette.

EXAMPLES

The following tests were used to evaluate the performance of the substrates treated according to the invention:

Oleophobicity Tests

The oleophobicity was measured according to the method described in "AATCC Technical Manual", Test Method 118, which evaluates the non-wettability of the substrate by a series of oily liquids whose surface tensions are increasingly weaker.

Another test consists in measuring the penetration time of a drop of dodecane (oil No. 5 of the test AATCC 118) placed on the support.

Hydrophobicity Tests

In order to test the hydrophobicity of the supports, the penetration time of a drop of water in the material was measured.

The water uptake of a 43 cm² surface of the support subjected to a height of 11 cm of water for one hour is also measured.

Anti-Graffiti Test

A plate of the support to be tested is written on with a black indelible felt-tip pen of reference NSO Pentel Pen Permanent Marker. After allowing to dry for 24 hours, the plate is cleaned by spreading methyl ethyl ketone over its surface. The cleaning is stopped when the solvent removes no more ink, and the appearance of the surface of the material is rated from 0 to 5 in the following manner:

5. After cleaning with methyl ethyl ketone, the plate has regained its original appearance: no felt-tip pen trace remains.

4. The ink has almost entirely disappeared after cleaning with methyl ethyl ketone: only a slight trace remains.

3. After cleaning with methyl ethyl ketone, there is partial and heterogeneous attenuation of the graffiti: more than 50% of the writing is removed.

2. After cleaning with methyl ethyl ketone, there is partial and heterogeneous attenuation of the graffiti: less than 50% of the writing is removed.

1. After cleaning with methyl ethyl ketone, there is only a very slight attenuation of the graffiti.

0. The cleaning has no effect.

The examples which follow, in which the parts and percentages are expressed by weight, except where otherwise mentioned, illustrate the invention without limiting it.

Example 1

122 parts of N-methyl-2-pyrrolidone, 27 parts of acetone, 10 parts of dimethylaminoethyl methacrylate, 5 parts of 2-hydroxyethyl methacrylate, 0.8 part of 4,4'-azobis(4-cyanopentanoic) acid, 81.4 parts of a mixture of fluoroalkyl acrylates of formula:

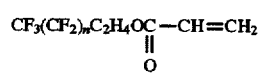

where n is equal to 5, 7, 9, 11, 13 in average and respective weight ratios of 1/63/25/9/3, were loaded into a 500-part by volume reactor fitted with a stirrer, a thermometer, a reflux condenser, a dropping funnel, a nitrogen inlet and a heating device.

The mixture was heated at 85° C. under a nitrogen atmosphere for 6 hours, followed by addition of 5 parts of acetic acid in 145 parts of water. The mixture was maintained for a further one hour at 75° C. and then allowed to cool to room temperature. 396 parts of a solution of a fluoro copolymer according to the invention, which contains 24.3% dry material and 13% fluorine (solution S hereinbelow), was thus obtained.

Using this solution and an aliphatic polyisocyanate based on a hexamethylene diisocyanate trimer rendered hydrophilic by reaction with a polyethoxylated alcohol so as to have an NCO content of 17.3% and a viscosity at 23° C. of 3500 mPa s (polyisocyanate P hereinbelow), a composition ($C_1$) according to the invention was prepared by dispersing 0.3 part of polyisocyanate (P) in 91.4 parts of water with stirring (magnetic bar: 200 rev/min), followed by addition of 8.3 parts of solution (S).

The NCO/OH ratio of the composition ($C_1$) is 1.5 and its shelf life in a container is longer than 48 hours.

This composition was applied, at a rate of 90 g/m², to earthenware paving stones.

By way of comparison, the following compositions were applied in the same manner to similar supports:

Composition $C_a$ solution (S) 8.6 parts water 91.4 parts

Composition $C_b$ polyisocyanate (P) 8.6 parts water 91.4 parts

The results obtained by subjecting the paving stones treated with the compositions $C_1$, $C_a$ and $C_b$ and an untreated paving stone to the tests described above are collated in the following table.

| Composition | Water uptake (g/m²) | AATCC 118 | Penetration time of dodecane |
|---|---|---|---|
| $C_1$ | 81 | 8 | >24 hours |
| $C_a$ | 251 | 8 | >24 hours |
| $C_b$ | 12100 | 0 | 10 minutes |
| Untreated paving stone | 12121 | 0 | 0 |

Examination of the results shows that the paving stones treated with the compositions $C_1$ and $C_a$ containing the solution (S) are the only ones to exhibit real hydrophobic and oleophobic properties.

Composition $C_1$ according to the invention allows the hydrophobicity of the support to be improved greatly, since the water uptake is divided by a factor of 3 compared with the composition $C_a$.

Example 2

Using the solution (S) and the polyisocyanate (P), two compositions according to the invention were prepared, comprising:

| | Composition $C_2$ | Composition $C_3$ |
|---|---|---|
| - solution (s) | 7.9 parts | 6.4 parts |
| - polyisocyanate | 0.7 parts | 2.2 parts |
| - water | 91.4 parts | 91.4 parts |

Compositions $C_2$ and $C_3$ differ from the composition $C_1$ in the NCO/OH ratio:

For the composition $C_2$: NCO/OH=3.6

For the composition $C_3$: NCO/OH=14.2

The container shelf life of the compositions $C_2$ and $C_3$ is not modified compared with the composition $C_1$.

These compositions were applied, at a rate of 90 g/m², to earthenware paving stones.

| Composition | Water uptake (g/m²) | AATCC 118 | Penetration time of dodecane |
|---|---|---|---|
| $C_1$ | 81 | 8 | >24 hours |
| $C_2$ | 70 | 8 | >24 hours |
| $C_3$ | 70 | 8 | >24 hours |

Examination of the results shows that the NCO/OH ratio may vary over a very wide range without noticeably modifying the performance of the treated paving slabs.

Example 3

Using 9.65 parts of solution (S), 0.35 part of polyisocyanate (P) and 90 parts of water, a composition $C_4$ having an NCO/OH ratio of 1.5 and a container shelf life of longer than 48 hours was prepared.

This composition was applied, at a rate of 300 g/m², to slabs of fascia concrete.

By way of comparison, the following compositions were applied in the same manner to similar supports:

Composition $C_c$ solution (S) 10 parts water 90 parts

Composition $C_d$ polyisocyanate (P) 10 parts water 90 parts

The results obtained by subjecting the slabs treated with the compositions $C_4$, $C_c$ and $C_d$ and an untreated slab to the anti-graffiti test described above are collated in the following table. In order to test the persistence of the coating, successive graffiti-cleaning sequences were carried out. The appearance of the surface of the material is rated after each cleaning.

| Composition | initial appearance | 1st graffiti | 2nd graffiti | 3rd graffiti | 4th graffiti | 5th graffiti | 9th graffiti |
|---|---|---|---|---|---|---|---|
| $C_4$ | 5 | 5 | 4 | 4 | 4 | 3 | 3 |
| $C_c$ | 5 | 4 | 3 | 2 | 2 | 1 | 1 |
| $C_d$ | 5 | 1 | 1 | 1 | 1 | 1 | 1 |

Rating of the Surface Appearance After One or More Graffiti-Cleaning Sequences

Examination of the results shows that only the composition $C_4$ according to the invention provides the support with genuine anti-graffiti properties.

In addition, the permanence of the treatment is good, since at least 5 graffiti-cleaning cycles are required in order to degrade substantially the appearance of the treated support.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Fluoro copolymer comprising an aqueous fluoro copolymer in salified or quaternized form, of (% by weight):

(a) 50 to 92% of at least one polyfluoro monomer of formula:

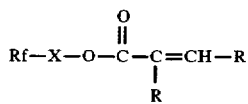
$$Rf-X-O-\underset{\underset{R}{|}}{\overset{\overset{O}{\|}}{C}}-C=CH-R \quad (I)$$

in which Rf represents a perfluoroalkyl radical with a straight or branched chain containing 2 to 20 carbon atoms, X represents a divalent grouping linked to O by a carbon atom and optionally containing at least one oxygen, sulphur and/or nitrogen atom, one of the symbols R represents a hydrogen atom and the other represents a hydrogen atom or an alkyl radical containing 1 to 4 carbon atoms;

(b) 1 to 25% of at least one monomer of formula:

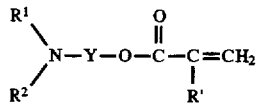
$$\underset{R^2}{\overset{R^1}{\diagdown}}N-Y-O-\underset{\underset{R'}{|}}{\overset{\overset{O}{\|}}{C}}-C=CH_2 \quad (II)$$

in which Y represents a linear or branched alkylene radical containing 1 to 4 carbon atoms, R' represents a hydrogen atom or an alkyl radical containing 1 to 4 carbon atoms, $R^1$ and $R^2$, which may be identical or different, each represent a hydrogen atom, a linear or branched alkyl radical containing 1 to 18 carbon atoms or a hydroxyethyl or benzyl radical, or $R^1$ and $R^2$, together with the nitrogen atom to which they are attached, form a morpholino, piperidino or pyrrolidinyl radical;

(c) 1 to 25% of at least one monomer of formula:

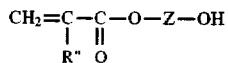
$$CH_2=\underset{\underset{R''}{|}}{C}-\overset{\overset{O}{\|}}{C}-O-Z-OH \quad (III)$$

in which R" represents a hydrogen atom or an alkyl radical containing 1 to 4 carbon atoms and Z represents an alkylene radical containing 2 to 4 carbon atoms; and (d) 0 to 30% of at least one monomer other than the monomers of formulae I, II and III.

2. Fluoro copolymer according to claim 1, wherein it comprises 70 to 90% of polyfluoro monomer(s) of formula (I), 2 to 18% of monomer(s) of formula (II), and 2 to 15% of monomer(s) of formula (III).

3. Fluoro copolymer according to claim 1 wherein the polyfluoro monomer is a polyfluoroalkyl acrylate of formula:

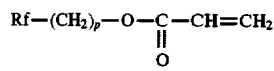
$$Rf-(CH_2)_p-O-\overset{\overset{}{\|}}{\underset{O}{C}}-CH=CH_2$$

in which Rf has the same meaning as in claim 1 and p is equal to 2 or 4.

4. Fluoro copolymer according to claim 1 wherein the monomer of formula (II) is dimethylaminoethyl methacrylate or N-tert-butylaminoethyl methacrylate.

5. Fluoro copolymer according to claims 1, wherein the monomer of formula (III) is an alkylene glycol acrylate or methacrylate.

6. Fluoro copolymer according to claim 5, wherein the monomer of formula (III) is 2-hydroxyethyl methacrylate.

* * * * *